Feb. 20, 1973  R. GOLD ET AL  3,717,767
DETECTION SYSTEM FOR HEAVY AND SUPERHEAVY COSMIC RAY NUCLEI
Filed Nov. 2, 1971  3 Sheets-Sheet 1

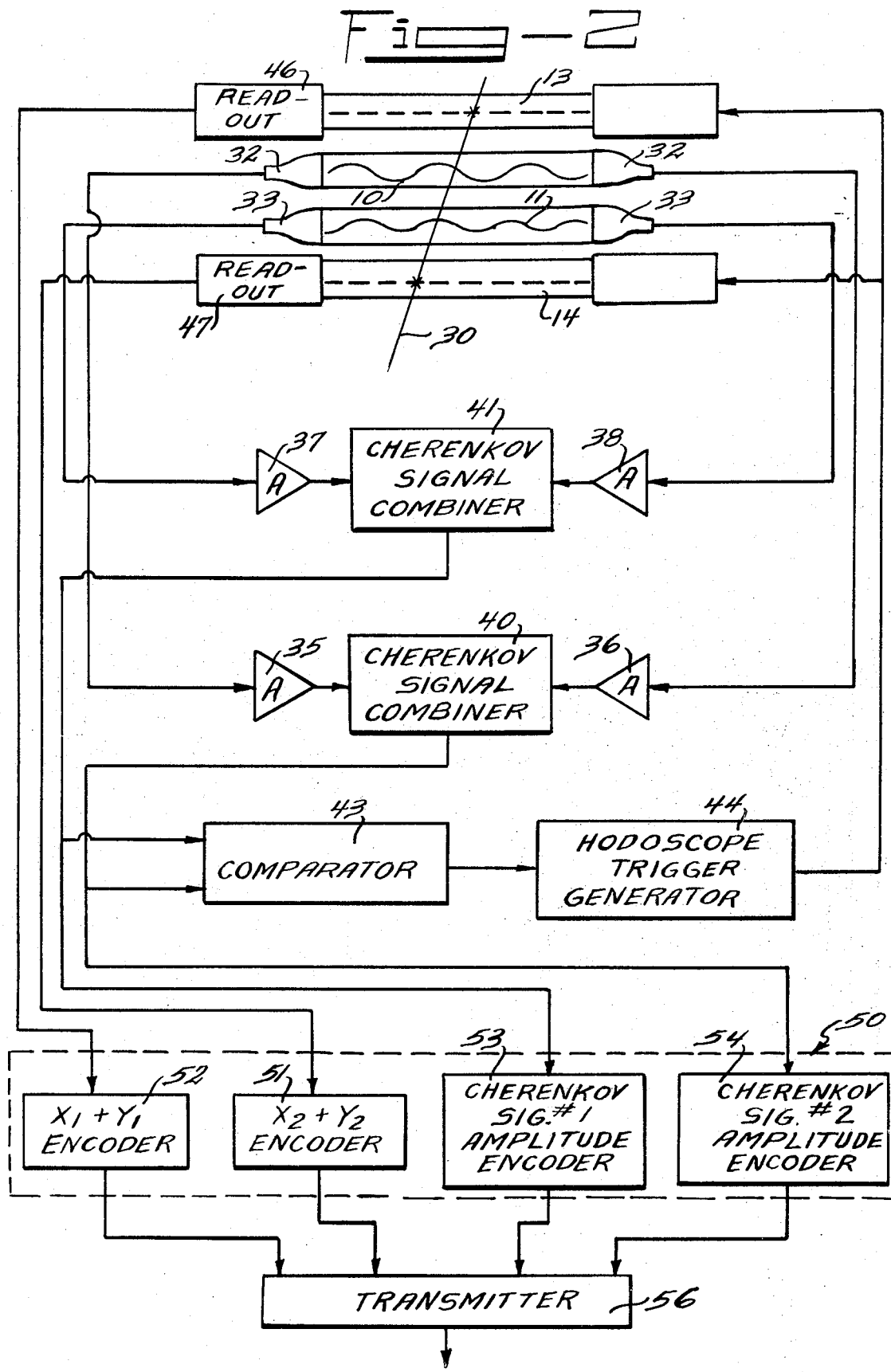

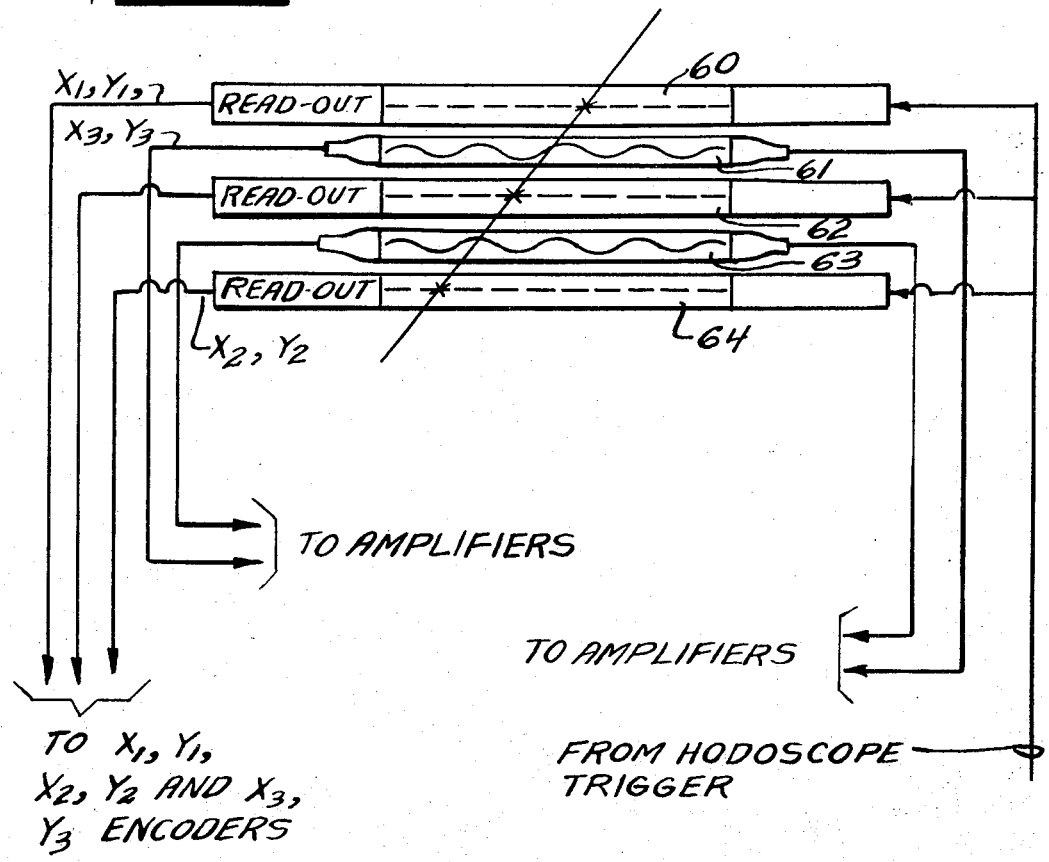

United States Patent Office 3,717,767
Patented Feb. 20, 1973

3,717,767
DETECTION SYSTEM FOR HEAVY AND SUPER-HEAVY COSMIC RAY NUCLEI
Raymond Gold, Woodridge, and Karl G. Porges, Evanston, Ill., assignors to the United States of America as represented by the United States Atomic Energy Commission
Filed Nov. 2, 1971, Ser. No. 194,962
Int. Cl. G01t 1/18
U.S. Cl. 250—83.6 R                5 Claims

ABSTRACT OF THE DISCLOSURE

A detection system using a pair of Cherenkov detectors of different refractive indices is used for the observation of heavy and superheavy relativistic cosmic ray nuclei. Hodoscopes are used in conjunction with the Cherenkov detectors to determine the path of the nuclei through the Cherenkov detectors. The velocity and charge of the cosmic ray nuclei are determined from conventional pulse height analysis.

CONTRACTUAL ORIGIN OF THE INVENTION

The invention described herein was made in the course of, or under, a contract with the United States Atomic Energy Commission.

BACKGROUND OF THE INVENTION

The charge, mass and energy distributions of heavy cosmic ray particles impinging on the upper atmosphere are amongst those fundamental observables of astrophysics which are as yet poorly known. Accurate charge spectrum measurements would provide an important experimental test for different cosmological models. The abundance of such heavy cosmic ray nuclei is an essential outgrowth of the nucleosynthesis theory of the elements, hence such data would permit more direct evaluation and refinement of proposed processes for heavy element synthesis than is presently possible.

The charge spectrum also plays a central role in theoretical descriptions of the origin, history and transport of cosmic radiation in the universe. Recent work with fossil cosmic ray tracks reveals that limited charge spectrum information averaged over millions of years can be obtained from meteorites. Vastly improved track data from lunar mineral specimens together with accurate present-day measurement would furnish valuable information on the long-term time dependence of the cosmic radiation. Further time-dependent information could be obtained through the detection of heavy cosmic ray radionuclides whose half lives are comparable with the age of the universe. Such knowledge would lead to a better understanding of the source, acceleration and storage of cosmic radiation in the galaxy. There have also been recent speculations concerning superheavy nuclei (of charge $Z=100$) which could possibly exist in the cosmic radiation. Existence of such elements would have a profound bearing on present concepts of the stability of heavy nuclei. Recent phenomenological nuclear models predict islands of stability for superheavy elements, the lowest of which lies in the region around $Z=11$.

Measurements of the charge spectrum of heavy cosmic rays have been principally carried out with emulsions and more recently these techniques have been supplemented with solid-state track recorders. Charge and velocity of recorded nuclei may be inferred from observed track length and grain density. The high penetrating power of these relativistic nuclei makes observation of track length impractical and reliance is therefore chiefly placed on grain density or delta-ray density, which is expected to be directly proportional to energy deposition density. The latter is known to be proportional to the second power of the charge, at least for velocities high enough to make charge pickup negligibly small. For very high velocities the energy deposition density also varies slightly with velocity; at lower velocities it eventually increases with the inverse first power of the velocity. Consequently, the charge of incident nuclei can be deduced from observed grain density only if the two following assumptions hold: (1) all observed tracks are due to the relativistic nuclei; and (2) the most commonly observed tracks are due to iron, $Z=26$.

Emulsion and track recorder measurements of the cosmic ray charge distribution are, quite apart from any question of interpretation, inherently limited in the amount of information which can be obtained from a single flight. The required scanning effort as well as considerations of load capacity, place an upper bound on the detector volume. With typical loads, the number of events which can be recorded in a flight of technically feasible duration is not sufficient to obtain statistically significant charge distribution data. Due to the very weak flux of heavy nuclei, longer flights, even if technically feasible, would have to contend with increasingly severe background due to the abundant low Z flux which limits the usefulness of any integrating method of detection. This consideration as well as the requirement of load recovery also militates against the use of these integrating detectors in satellites.

It is therefore an object of this invention to provide a detection system for heavy and superheavy cosmic ray nuclei in which measurements are made by a nonintegrating method and in which charge and velocity are both unambiguously observed.

Another object of this invention is to provide a detection system for heavy and superheavy cosmic ray nuclei which has a high degree of discrimination against low Z flux.

Another object of this invention is to provide a detector system for heavy and superheavy cosmic ray nuclei which can provide information without load recovery and which can be designed to meet the weight and bulk limitations of either balloon or satellite experiments.

SUMMARY OF THE INVENTION

In practicing this invention, two back-to-back Cherenkov detectors of identical thickness possessing different refractive indices are used. Two-dimensional hodoscopes are located above and below these Cherenkov detectors. The hodoscopes are triggered to determine the path traversed in the Cherenkov detectors by the cosmic ray nuclei only if the signals from the Cherenkov detectors simultaneously exceed prescribed levels. All of the information necessary in analyzing an event consists of the pulse height signals from the Cherenkov detectors and the coordinates furnished by the hodoscopes. This information can be stored in the balloon or satellite for later recovery or can be transmitted to a ground station through telemetry techniques which are well known.

BRIEF DESCRIPTION OF THE DRAWINGS

The invention is illustrated in the drawings, of which:
FIG. 2 is a block diagram showing the operation of the detection system;
FIG. 4 is a block diagram of a second embodiment of the invention.

DETAILED DESCRIPTION OF THE INVENTION

Figure 1:
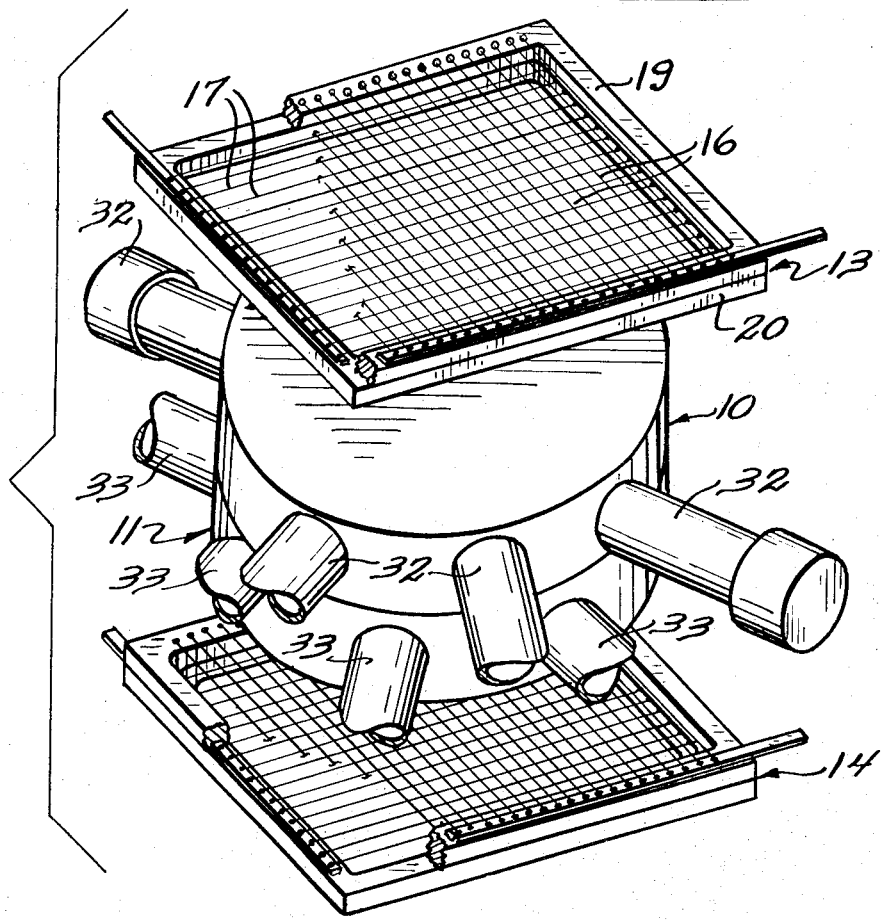
FIG. 1 is a perspective drawing of the detection system.

Referring to FIGS. 1 and 2, there are shown perspective and block diagrams of the structure of the invention. A pair of Cherenkov detectors 10 and 11 of equal thickness are placed in a back-to-back configuration. A pair of hodoscopes 13 and 14 are placed above and below the Cherenkov detectors. In this configuration a cosmic ray nuclei within a predetermined solid angle (determined by the size and spacing of the hodoscopes and Cherenkov detectors) will pass through each of the Cherenkov detectors and the hodoscopes.

Figure 3:
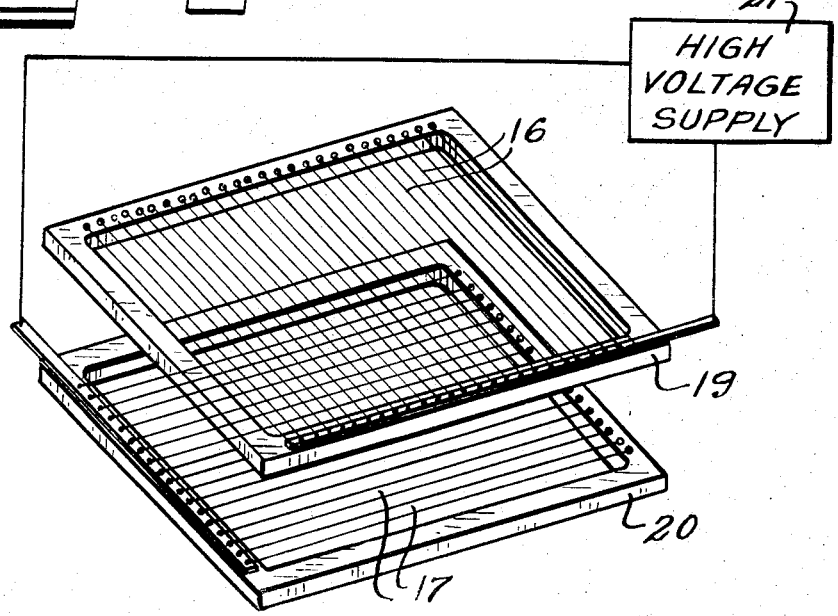
FIG. 3 is a perspective drawing of a hodoscope.

The hodoscopes 13 and 14 are devices which detect the position at which the cosmic ray nuclei pass through the plane of the hodoscope. These may take the form of a two-dimensional spark counter as shown in FIG. 3. The spark counter consists of two wire planes 16 and 17 with the wires in the separate planes at right angles. The wires of each plane are held in conductive frames 19 and 20 which are in turn connected to a high-voltage supply 21. Thus there is a high voltage between the wires of the planes. When a particle such as a cosmic ray nuclei ionizes the gas between the wires a spark will be developed and current will flow in two of the wires—one in each plane. The wires in which the current flows can be detected to develop $x$, $y$ coordinates of the point at which the cosmic ray nuclei passes through the hodoscope plane. The wires can be detected, for example, by setting magnetic cores with the current flowing in the wires and reading which cores have been set or by reading out the time interval between a trigger pulse applying high voltage to the planes and the arrival of an acoustic pulse at the end of a magnetostrictive wire acoustically coupled to the wires of the plane.

The above are examples of hodoscopes which are well known to those skilled in the art. However, the term hodoscope is not limited to these examples but applies to a device which measures the point at which a particle passes through the plane of the hodoscope to develop the $x$, $y$ coordinates of that point. Thus the hodoscopes 13 and 14 develop position coordinates $x_1$, $y_1$ and $x_2$, $y_2$ of particles which pass between the hodoscopes. Since the geometry of the hodoscopes and the Cherenkov detectors are known, the path length of the particle through the Cherenkov detectors can be calculated using the well-known methods of analytical geometry.

Referring to FIG. 2, there is shown a cosmic ray nuclei 30 which passes through Cherenkov detectors 10 and 11 and hodoscopes 13 and 14. This nuclei could pass through the detection system in either direction. The cosmic ray nuclei, upon entering Cherenkov detectors 10 and 11, develops Cherenkov radiation therein. The refractive indices of Cherenkov detectors 10 and 11 are different so that the intensity of Cherenkov radiation generated in each Cherenkov detector is of a different amplitude. For example, one Cherenkov detector could contain water (index of refraction 1.33) and the other carbon disulfide (index of refraction 1.64).

The Cherenkov radiation in each Cherenkov detector is detected by the photomultiplier tubes 32 and 33. The electrical signals from these tubes are coupled to amplifiers 35-38 where the signals are amplified. The signals from amplifiers 35 and 36 are combined in signal combiner 40 to develop an output signal having an amplitude proportional to the intensity of Cherenkov radiation in Cherenkov detector 10. The signals from amplifiers 37 and 38 are combined in signal combiner 41 to develop an output signal having an amplitude proportional to the intensity of Cherenkov radiation in Cherenkov detector 11. Since the Cherenkov radiation is weak, a plurality of photomultipliers are used to increase the efficiency of the detection system.

Since there is normally a very weak flux of heavy ($Z \geq 26$) and superheavy ($Z \geq 80$) cosmic ray nuclei superimposed on a stronger background flux of lighter particles, the detection system acts to differentiate between the different nuclei. The Cherenkov radiation intensity signals $P_1$ and $P_2$ from combiners 40 and 41 are coupled to a comparator 43. In the comparator 43 the signals $P_1$ and $P_2$ are compared to a reference signal and the comparator 43 develops an output signal only if each of the Cherenkov intensity signals $P_1$ and $P_2$ are greater than the reference signal. By requiring each of the two signals $P_1$ and $P_2$ to be greater than the reference signal only cosmic ray nuclei passing through both Cherenkov detectors are monitored.

The output signal from comparator 43 is coupled to hodoscope trigger generator 44 to develop the high voltages required to operate the hodoscopes 13 and 14. These hodoscopes are thus triggered as previously described to develop the output signals from readout circuits 46 and 47 representative of the $x$ and $y$ coordinates of the points at which the cosmic ray nuclei pass through the hodoscope planes. By this means, only events of interest are detected, that is only events in which heavy or superheavy cosmic ray nuclei pass through both Cherenkov detectors.

The $x$, $y$ signals and the $P_1$ and $P_2$ signals are coupled to a telemetry system 50 which operates in a well-known manner to encode the signals for transmission to a remote location. The $x$ and $y$ signals are encoded in the $x_1$, $y_1$ encoder 52 and the $x_2$, $y_2$ encoder 51. The $P_1$ signals are encoded in the amplitude encoder 53 and the $P_2$ signals are encoded in the amplitude encoder 54. The $P_1$, $P_2$, $x_1$, $y_1$, $x_2$ and $y_2$ encoded signals are coupled to transmitter 56 for transmission to a remote location. While a telemetry transmitter system has been shown, any form of data transmission and/or storage system can be used as desired.

Referring to FIG. 4, there is shown a Cherenkov hodoscope detection system using a third hodoscope 62 placed between Cherenkov detectors 61 and 63. Hodoscopes 60 and 64 are the same as hodoscopes 13 and 14 of FIG. 2. The Cherenkov detectors 61 and 63 develop the Cherenkov radiation intensity signals which are coupled to amplifiers as shown in FIG. 2. Also the hodoscopes 60, 62 and 64 develop $x_1$, $y_1$, $x_2$, $y_2$, $x_3$ and $y_3$ signals in the same manner as the hodoscopes 13 and 14 of FIG. 2.

The use of a third hodoscope provides additional discrimination against spurious events. A colinearity constraint in the response of all three planar hodoscopes could then be required of events of interest. Moreover, for events of interest this third hodoscope would provide redundant data and therefore more accurate values of the traversed path lengths could be provided.

Expressions for the Cherenkov pulse height signals $P_1$ and $P_2$ are available directly from the well-established formula for the intensity of Cherenkov radiation.

$$P_1 = \epsilon_1 \cdot \frac{\alpha Z^2}{c} \cdot [1 - (\beta n_1)^{-2}] \cdot s \qquad (1a)$$

$$P_2 = \epsilon_2 \cdot \frac{\alpha Z^2}{e} \cdot [1 - (\beta n_2)^{-2}] \cdot s \qquad (1b)$$

Where $\epsilon$ is a scaling constant
$\alpha$ is the fine structure constant
$Z$ is the particle charge
$c$ is the velocity of light
$\beta = v/c$ where $v =$ particle velocity and $c =$ velocity of light
$n$ is the refractive index of the Cherenkov counter
$s$ is the path length of the particle in the Cherenkov detector.

It is assumed that the analyzed particles traverse the same path lengths in both Cherenkov detectors. This condition is met by requiring appropriate coordinate signals from the upper and lower hodoscopes. Incident nuclei that undergo collision or spallation within the hodoscope are discarded by vetoing events for which more than one address occurs in any spark chamber plane.

The scaling constants $\epsilon_1$ and $\epsilon_2$ in Equations 1a and 1b account for light collection efficiencies of the several photomultipliers coupled to each radiator. Also included in these constants is the gain or attenuation in the detector channels.

Particle velocity ($v$) is determined from the ratio of radiation light yields, $$r_{12} = \frac{Y_1}{Y_2} \qquad (2)$$

where $$Y_1 = P_1/\epsilon_1$$
$$Y_2 = P_2/\epsilon_2 \qquad (3)$$

Combining Equations 1 to 3

$$r_{12} = \left(\frac{\epsilon_2}{\epsilon_1}\right) \cdot \left(\frac{P_1}{P_2}\right) = \frac{[1-(\beta n_1)^{-2}]}{[1-(\beta n_2)^{-2}]} \qquad (4)$$

From (4)

$$\beta^2 = \frac{n_2^{-2} r_{12} - n_1^{-2}}{r_{12} - 1} \qquad (5)$$

Consequently, the $\beta$ measurement depends only on the ratio of scaling constants and is therefore relatively insensitive to variations in light collection efficiency, voltage drifts, and temperature-dependent fluctuations in photomultiplier gain. The dependence of $\beta$ on relative pulse height only is a major advantage of this method.

The atomic number is determined from both pulse heights, $P_1$ and $P_2$ as well as the hodoscope information through which the path lengths is determined. From Equations 1 to 5

$$Z = \left[\frac{c}{\alpha \cdot s}\right]^{1/2} \left[\frac{Y_1 n_1^2 - Y_2 n_2^2}{n_1^2 - n_2^2}\right]^{1/2}$$

This detection system provides the $\beta$ and Z observables of heavy and superheavy cosmic ray nuclei. From this data the approximate mass number A can be inferred from the known systematics of the stable nuclei. Since A and Z are correlated through the stability line of the nuclides, particle mass can be estimated from the observed atomic number Z. An approximate total kinetic energy can then be deduced using this mass number estimate together with the observed value of $\beta$.

The embodiments of the invention in which an exclusive property or privilege is claimed are defined as follows:

1. A detection system for cosmic ray nuclei comprising: first and second hodoscopes positioned in substantially parallel alignment, first and second Cherenkov detectors having different refractive indices and positioned adjacent said first and second hodoscopes and in substantially parallel alignment therewith so that cosmic ray nuclei within a predetermined solid angle pass through each of said first and second hodoscopes and said first and second Cherenkov detectors, said first and second Cherenkov detectors being responsive to the cosmic ray nuclei passing therethrough to develop first and second Cherenkov signals respectively, activation means coupled to said first and second Cherenkov detectors and said first and second hodoscopes and responsive to said first and second Cherenkov signals to develop an activation signal with each of said first and second Cherenkov signals being greater than a predetermined magnitude, said first and second hodoscopes being responsive to said activation signal to develop first and second position signals respectively which are determinant of the path of the cosmic ray nuclei passing through said first and second Cherenkov detectors, and utilization means coupled to said first and second Cherenkov detectors and said first and second hodoscopes for receiving said first and second Cherenkov signals and said first and second position signals.

2. The cosmic ray nuclei detection system of claim 1 wherein, said first and second Cherenkov detectors are positioned between said first and second hodoscopes.

3. The cosmic ray nuclei detection system of claim 2 wherein, said utilization means includes telemetry means for developing telemetry signals in response to said first and second Cherenkov signals and said first and second position signals.

4. The cosmic ray nuclei detection system of claim 2 further including, a third hodoscope positioned between said first and second Cherenkov detectors, said third hodoscope being coupled to said activation means and said utilization means, said third hodoscope being responsive to said activation signal to develop a third position signal and apply the same to said utilization means.

5. The cosmic ray nuclei detection system of claim 2 wherein, the Cherenkov radiator of said first Cherenkov detector is water and the Cherenkov radiator of said second Cherenkov detector is carbon disulfide.

References Cited

UNITED STATES PATENTS

| 3,418,474 | 12/1968 | Spergel | 250—83.6 R |
| 3,359,421 | 12/1967 | Mendez et al. | 250—83.6 R |
| 3,603,797 | 9/1971 | Borkowski | 250—83.6 R |

JAMES W. LAWRENCE, Primary Examiner

H. A. DIXON, Assistant Examiner

U.S. Cl. X.R,

250—71.5 R